(12) United States Patent
Kojima et al.

(10) Patent No.: US 7,902,968 B2
(45) Date of Patent: Mar. 8, 2011

(54) OBSTACLE DETECTION DEVICE

(75) Inventors: Kiyonari Kojima, Nishikamo-gun (JP);
Hisanaga Matsuoka, Okazaki (JP);
Akio Nakano, Anjo (JP); Muneaki Matsumoto, Okazaki (JP)

(73) Assignees: Denso Corporation, Kariya (JP);
Nippon Soken, Inc., Nishio (JP)

( * ) Notice: Subject to any disclaimer, the term of this patent is extended or adjusted under 35 U.S.C. 154(b) by 838 days.

(21) Appl. No.: 11/603,902

(22) Filed: Nov. 24, 2006

(65) Prior Publication Data
US 2007/0115758 A1 May 24, 2007

(30) Foreign Application Priority Data
Nov. 24, 2005 (JP) ................. 2005-338760

(51) Int. Cl.
*B60Q 1/00* (2006.01)
*G08B 13/00* (2006.01)
*G01B 17/02* (2006.01)
*G01S 15/00* (2006.01)

(52) U.S. Cl. ......... 340/435; 340/436; 340/565; 340/566; 73/627; 73/628; 73/632; 73/645; 73/649; 367/89; 367/99; 367/189

(58) Field of Classification Search .......... 340/435–436, 340/565–566; 73/627–649; 367/89–99, 367/189
See application file for complete search history.

(56) References Cited

U.S. PATENT DOCUMENTS

| | | | | |
|---|---|---|---|---|
| 4,292,679 A | * | 9/1981 | Kondo et al. | 367/188 |
| 5,875,105 A | * | 2/1999 | Kim | 363/65 |
| 6,085,592 A | * | 7/2000 | Kawashima | 73/632 |
| 6,087,760 A | | 7/2000 | Yamaguchi et al. | |
| 6,250,162 B1 | | 6/2001 | Amaike et al. | |
| 6,318,774 B1 | * | 11/2001 | Karr et al. | 293/117 |
| 6,490,226 B2 | * | 12/2002 | Iwasaki et al. | 367/97 |
| 6,593,680 B2 | | 7/2003 | Amaike et al. | |
| 7,240,555 B2 | * | 7/2007 | Kawashima | 73/632 |
| 7,518,491 B2 | | 4/2009 | Oda et al. | |

(Continued)

FOREIGN PATENT DOCUMENTS

DE 42 38 924 5/1994

(Continued)

OTHER PUBLICATIONS

German Office Action dated Mar. 3, 2008 issued in counterpart German Application 10-2006 055 168.0-35 with English translation.

(Continued)

*Primary Examiner* — Benjamin C Lee
*Assistant Examiner* — Lam P Pham
(74) *Attorney, Agent, or Firm* — Nixon & Vanderhye PC (57) ABSTRACT

An obstacle detection device has an ultrasonic sensor fixed to a first side of a mount member. The ultrasonic sensor sends/receives ultrasonic wave toward/from a second side of the mount member, which is opposite to the first side thereof. At least one of a mounting surface of the ultrasonic sensor and a mounting surface of the mount member has a protrusion, which protrudes therefrom so that an end surface of the protrusion contacts the other of the mounting surfaces. The mounting surfaces of the mount member and the ultrasonic sensor face each other. The end surface of the protrusion and the mounting surface of the ultrasonic sensor are different from each other in at least one of shape and area thereof.

19 Claims, 6 Drawing Sheets

U.S. PATENT DOCUMENTS

| | | |
|---|---|---|
| 7,591,182 B2 | 9/2009 | Sato et al. |
| 7,626,888 B2 | 12/2009 | Nakano et al. |

FOREIGN PATENT DOCUMENTS

| | | |
|---|---|---|
| GB | 2272819 A | 5/1994 |
| JP | 59-166599 | 11/1984 |
| JP | 62-254600 | 11/1987 |
| JP | 10-123236 | 5/1998 |
| JP | 2000-152388 | 5/2000 |
| JP | 2002-58091 | 2/2002 |
| JP | 2002-315096 | 10/2002 |
| JP | 2004-264264 | 9/2004 |
| WO | WO 95/02237 | 1/1995 |

OTHER PUBLICATIONS

Chinese Office Action dated Feb. 13, 2009, issued in corresponding Chinese Application No. 200610163744.0, with English translation.

U.S. Appl. No. 11/492,925, filed Jul. 2006, Oda et al.

Japanese Office Action dated Oct. 26, 2010 issued in corresponding Japanese Application No. 2005-338760, with English Translation.

Decision on Rejection dated Oct. 16, 2009, issued in corresponding Chinese Application No. 200610163744.0, with English translation.

* cited by examiner

OBSTACLE DETECTION DEVICE

CROSS REFERENCE TO RELATED APPLICATION

This application is based on a Japanese Patent Application No. 2005-338760 filed on Nov. 24, 2005, the disclosure of which is incorporated herein by reference.

FIELD OF THE INVENTION

The present invention relates to an obstacle detection device.

BACKGROUND OF THE INVENTION

Generally, an ultrasonic sensor can be provided to detect an obstacle positioned around a vehicle, for example. As disclosed in JP-2004-264264A, a hole is arranged at a bumper of the vehicle. The head portion of the ultrasonic sensor is exposed from the hole in such a manner that the surface of the head portion is in a same surface with an outer surface of the bumper. In this case, the head portion of the ultrasonic sensor is exposed outside the vehicle. It is not preferable in terms of design.

As disclosed in JP-10-123236A, a recess is provided at the back side of the bumper of the vehicle to accommodate therein an ultrasound vibration type sensor (ultrasonic sensor). In this case, the ultrasonic sensor becomes invisible from the exterior of the vehicle, thus maintaining an outward appearance of the vehicle.

With reference to JP-10-123236A, the ultrasonic sensor has an ultrasonic vibrator, which is constructed of a disk-shaped ceramic and integrally stacked at a metallic base. The ultrasonic sensor is arranged at the recess, with an outer surface of the ceramic directly contacting a bottom of the recess. In this case, it is not specifically taken into consideration to obtain a desired directivity.

However, in the case where the obstacle detection device is used for a bumper of a vehicle, it is generally demanded that the directivity of the obstacle detection device in a horizontal direction relative to the ground surface is wide and that in a vertical direction is narrow, in order to restrict an erroneous detection due to a road surface, an edge stone and the like.

SUMMARY OF THE INVENTION

In view of the above-described disadvantages, it is an object of the present invention to provide an obstacle detection device which is capable of a desired directivity.

According to an aspect of the present invention, an obstacle detection device has a mount member and an ultrasonic sensor which is fixed to a first side of the mount member. The ultrasonic sensors ends ultrasonic wave toward a second side of the mount member and receives ultrasonic wave from the second side. The first side of the mount member is opposite to the second side thereof. At least one of a mounting surface of the ultrasonic sensor and a mounting surface of the mount member has a protrusion, which protrudes therefrom so that an end surface of the protrusion contacts an other of the mounting surfaces. The mounting surface of the mount member is at the first side thereof and faces the mounting surface of the ultrasonic sensor. The end surface of the protrusion and the mounting surface of the ultrasonic sensor are different from each other in at least one of shape and area thereof.

Thus, ultrasonic wave (vibration) is transmitted between the ultrasonic sensor and the mount member through the protrusion. Because the end surface of the protrusion and the mounting surface of the ultrasonic sensor are different from each other in at least one of shape and area thereof, the protrusion can restrict (define in predetermined range) a main transmission range of ultrasonic wave (vibration). Therefore, a desired directivity can be provided.

Moreover, because the shape of the protrusion can be optionally set, it is capable of providing a desired directivity, for example, a lopsided directivity which is different in a horizontal direction and a vertical direction with respect to a ground surface. For example, the directivity of the obstacle detection device in the horizontal direction can be set wide and that in the vertical direction can be set narrow. Therefore, the obstacle detection device can be suitably used for a vehicle, thus restricting an erroneous detection due to a road surface, an edge stone and the like.

Preferably, the ultrasonic sensor contacts the mount member at a contact portion of the mount member. The mount member has at least one of a thin-walled portion which has a smaller thickness than the contact portion of the mount member to construct a recess at the first side of the mount member, a thick-walled portion which has a larger thickness than the contact portion to project toward the first side of the mount member, and a multilayer portion having a stack member which is made of a different material from that of the mount member and fixed to the first side of the mount member. The thin-walled portion, the thick-walled portion and the multilayer portion are positioned around the contact portion of the mount member.

Thus, the stiffness of the mount member around the contact portion thereof can be set different from the stiffness of the contact portion. That is, it is doable to reduce ultrasonic wave (vibration) transmitted around the contact portion of the mount member. Accordingly, mutual cancellation, interference and the like of ultrasonic wave (vibration) due to a vibration-phase difference between the contact portion and the surrounding thereof can be reduced, thus enabling ensuring a desired directivity.

More preferably, the ultrasonic sensor includes an ultrasound oscillator for sending and receiving ultrasonic wave, and a housing in which the ultrasound oscillator is housed and fixedly contacts an inner surface of an end portion of the housing. The mounting surface of the ultrasonic sensor is an outer surface of the end portion of the housing. The protrusion protrudes from the mounting surface of the first side of the mount member so that the end surface of the protrusion contacts the outer surface of the end portion of the housing.

Thus, the protrusion is provided at the first side (e.g., inner surface) of the mount member, to which the ultrasonic sensor is mounted. That is, ultrasonic wave (vibration) is transmitted between the ultrasonic sensor and the mount member through the protrusion. Because the end surface of the protrusion and the outer surface of the end portion of the housing can be different from each other in at least one of shape and area, the protrusion can restrict a main transmission range of ultrasonic wave (vibration). Thus, a desired directivity can be provided.

According to another aspect of the present invention, an obstacle detection device has a mount member, and an ultrasonic sensor which is fixedly to a first side of the mount member and contacts the mount member at a contact portion of the mount member. The ultrasonic sensor includes an ultrasound oscillator for sending ultrasonic wave toward a second side of the mount member and receiving ultrasonic wave from the second side. The first side of the mount member is opposite to the second side thereof. The mount member has at least one of a thin-walled portion which has a smaller thickness than the contact portion of the mount member to construct a recess at the first side of the mount member, and a multilayer portion having a stack member which is made of a different material from that of the mount member and fixed to the first side of the mount member. The thin-walled portion and the multilayer portion have a predetermined annular shape to surround the contact portion of the mount member.

Thus, the stiffness of the mount member around the contact portion thereof can be different from the stiffness in the contact portion. That is, ultrasonic wave transmitted to a periphery of the contact portion can be decreased. Furthermore, because the mount member has at least one of the thin-walled portion and the multilayer portion which has the predetermined shape to surround the contact portion, a desired directivity can be provided.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLE EMBODIMENTS

First Embodiment

Figure 1A:
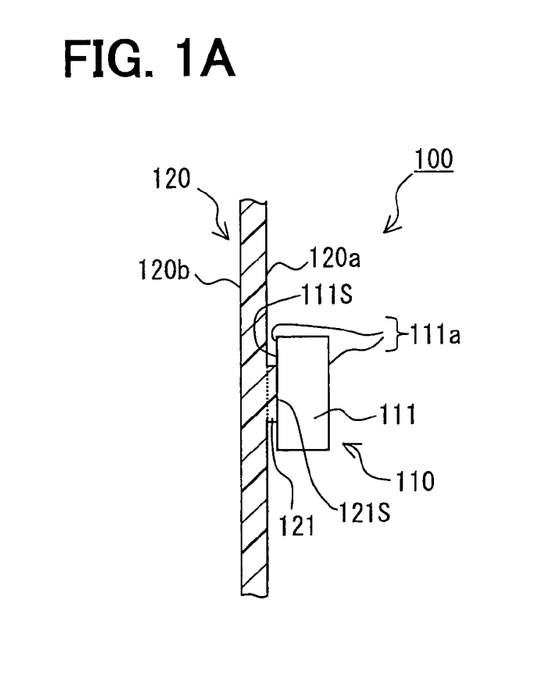
FIG. 1A is a partially sectional view showing an obstacle detection device according to a first embodiment of the present invention.
Figure 1B:
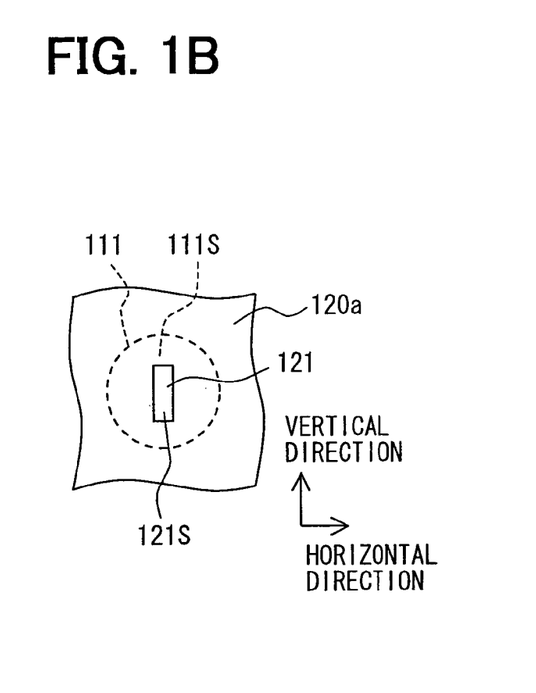
FIG. 1B is a plan view showing a mount member of the obstacle detection device when being viewed from an inner side of the mount member according to the first embodiment.

An obstacle detection device 100 according to a first embodiment of the present invention will be described with reference to FIGS. 1A-2. As shown in FIG. 1, the obstacle detection device 100 has an ultrasonic sensor 110 fixed to a mount member 120.

The ultrasonic sensor 110, being attached to a mounting surface 120a (e.g., inner surface) of a first side of the mount member 120, can be provided with an ultrasonic oscillator 111 which sends ultrasonic wave from the first side of the mount member 120 and receives ultrasonic wave (e.g., ultrasonic wave which is reflected by obstacle) from a second side (side of outer surface 120b) of the mount member 120. The first side of the mount member 120 is opposite to the second side thereof.

In this embodiment, the ultrasonic oscillator 111 of the ultrasonic sensor 110 can be directly mounted to the inner surface 120a of the mount member 120. For example, the ultrasonic sensor 110 can be fixedly positioned by a support member (i.e., holder which is not shown) which is fixed to the inner surface 120a of the mount member 120. In this case, the manner for fixing the ultrasonic sensor 110 is not specifically limitative.

The ultrasonic oscillator 111 can be constructed of a piezoelectric oscillator, which comprises a sintered compact of a piezoelectric ceramic such as PZT, barium titanate, or the like. In the case of the piezoelectric oscillator constructed of PZT is used, the piezoelectric oscillator will have strain due to dielectric polarization to vibrate longitudinally (i.e., in thickness-wise direction) to generate ultrasonic wave, when a drive signal is applied to the piezoelectric oscillator.

As shown in FIG. 1B, the ultrasonic oscillator 111 has a mounting surface 111s (i.e., surface of end portion of ultrasonic oscillator 111) which faces the mount member 120 and has a substantially circular shape, for example. In FIG. 1B, the boundary of the mounting surface ills of the ultrasonic oscillator 111 is indicated by a broken line to show the positional relationship. The ultrasonic oscillator 111 is connected with a circuit member (not shown) via a lead 111a, as shown in FIG. 1A.

The construction material of the mount member 120 and the thickness thereof are set to be suitable for transmission of ultrasonic wave. For example, the mount member 120 can be constructed of a bumper of a vehicle. That is, the obstacle detection device 100 can be suitably used as a vehicle obstacle detection device for detecting an obstacle around the vehicle. The bumper can be made of a synthetic resin such as urethane or the like. Alternatively, the mount member 120 can be also constructed of a metal plate which is a part of a chassis member of the vehicle or the like.

The mount member 120 has a protrusion 121, which protrudes from the inner surface 120a of the mount member 120 so that an end surface 121s of the protrusion 121 contacts the mounting surface 111s of the ultrasonic sensor 110 (ultrasonic oscillator 111). That is, ultrasonic wave (vibration) is transmitted between the ultrasonic sensor 110 (ultrasonic oscillator 111) and the mount member 120 through the protrusion 121.

The end surface 121s of the protrusion 121 and the mounting surface 111s of the ultrasonic oscillator 111 are different from each other in at least one of shape and area thereof. That is, a main range of transmission of ultrasonic wave (vibration) between the ultrasonic sensor 110 (ultrasonic oscillator 111) and the mount member 120, is restricted via the protrusion 121 to have a predetermined range.

In this embodiment, the end surface 121s of the protrusion 121 has a smaller area than the substantially circular-shaped mounting surface 111s of the ultrasonic oscillator 111. The end surface 121s of the protrusion 121 can have a substantial rectangular shape, which is longer in a direction (e.g., vertical direction) perpendicular to a traveling surface of the vehicle than in a direction (e.g., horizontal direction) parallel to the traveling surface. In this case, the whole end surface 121s of the protrusion 121 is in contact with the mounting surface 111s of the ultrasonic oscillator 111. The protrusion 121 can be made integrally (e.g. integrally molded) with the mount member 120 by the same material.

Figure 2:
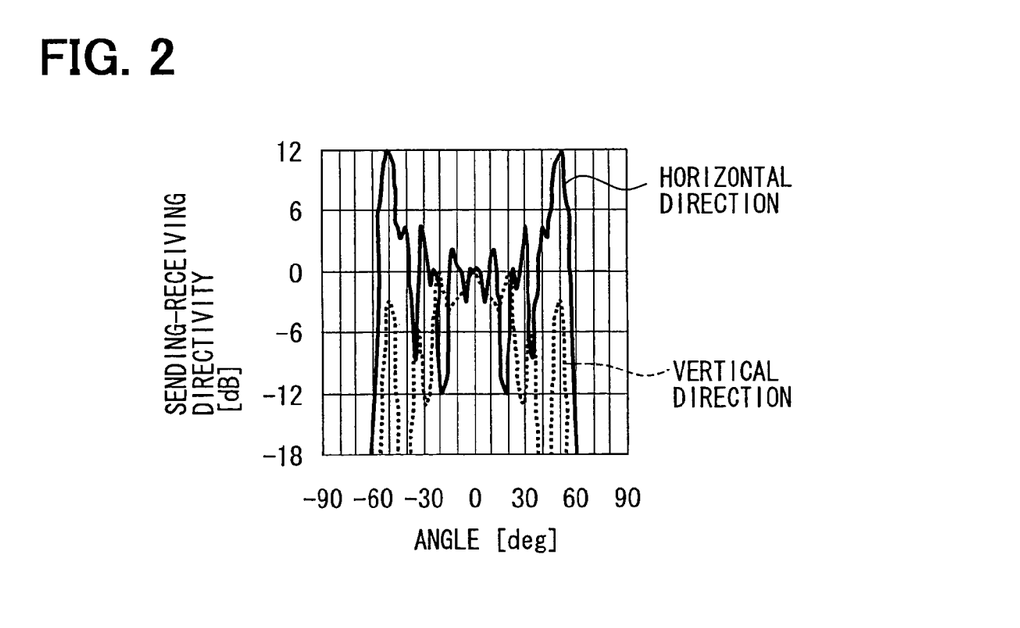
FIG. 2 is a graph showing measurement results of a sending-receiving directivity of the obstacle detection device according to the first embodiment.

FIG. 2 shows the measurement results of the sending-receiving directivity of the obstacle detection device 100. Referring to FIG. 2, the directivity of the obstacle detection device 100 is wider in the horizontal direction than in the vertical direction. That is, the directivity of the obstacle detection device 100 is narrower in the vertical direction. Accordingly, the obstacle detection device 100 can be suitably used as the vehicle obstacle detection device for detecting the obstacle around the vehicle.

According to the obstacle detection device 100 of this embodiment, the main transmission range of ultrasonic wave (vibration) can be restricted (defined in predetermined range) via the protrusion 121. In this case, the protrusion 121 has the end surface 121s which is different from the mounting surface 111s of the ultrasonic oscillator 111 in at least one of shape and area, so that the desired directivity can be provided.

Moreover, irrespective of the magnitude and shape of the ultrasonic oscillator 111, the transmission range of ultrasonic wave (vibration) in the mount member 120 can be optionally set via the protrusion 121 so as to obtain a preferable directivity. Thus, the desired directivity can be provided even when a lopsided directivity is requested as described above.

However, the configuration of the protrusion 121 is not limited to the above example. It suffices that the end surface 121s of the protrusion 121 and the mounting surface 111s of the ultrasonic oscillator 111 are different from each other in at least one of shape and area thereof.

For example, the end surface 121s of the protrusion 121 can be larger than the mounting surface 111s of the ultrasonic oscillator 111, and the whole mounting surface 111s of the ultrasonic oscillator 111 is in contact with the end surface 121s of the protrusion 121. However, in the case where the mount member 120 is vibration-excited by ultrasonic wave at a wide range, the vibration at different positions differs from each other in phase to be canceled and interfered. Therefore, the directivity of the ultrasonic sensor 110 is readily narrowed and becomes irregular.

Accordingly, as shown in this embodiment, the protrusion 121 is preferably structured such that the end surface 121s of the protrusion 121 is smaller than the mounting surface 111s of the ultrasonic oscillator 111 and the whole end surface 121s of the protrusion 121 is contact with the mounting surface 111s of the ultrasonic oscillator 111. In this case, when ultrasonic wave is received and transmitted by the ultrasonic oscillator 111, ultrasonic wave (vibration) can be efficiently transmitted between the ultrasonic oscillator 111 (ultrasonic sensor 110) and the protrusion 121. Therefore, a desired directivity can be provided.

As described above, the end surface 121s of the protrusion 121 is provided with the substantially rectangular shape, which is longer in the vertical direction than in the horizontal direction. However, the shape and the area of the end surface 121s can be optionally set according to a requested detection area and sending-receiving frequency of ultrasonic wave.

Moreover, the plurality of protrusions 121 can be also arranged at the mount member 120. In this case, ultrasonic wave (vibration) is transmitted through the plurality of protrusions 121.

The protrusion 121 can be integrated (e.g., integrally molded) with the mount member 120, to be made of the same material as that of the mount member 120. In this case, it is achievable to reduce the reflection loss generated on a boundary surface between different materials due to an acoustic impedance difference therebetween. Alternatively, the protrusion 121 may not be molded integrally with the mount member 120. The protrusion 121 can be made of a different material from that of the mount member 120.

Second Embodiment

A second embodiment of the present invention will be described with reference to FIGS. 3A-7.

In the above-described first embodiment, the protrusion 121 is arranged at the mount member 120 so that the desired directivity (e.g., lopsided directivity which is wider in horizontal direction than in vertical direction) can be provided. However, with reference to FIG. 2 which shows the directivity of the obstacle detection device 100 according to the first embodiment, the directivity is deteriorated at a certain angle (for example, near ±30 deg in vertical direction). It is thought that the deterioration of the directivity is generated by an action (for example, interference) of unnecessary vibrations which is transmitted to the mount member 120 from the periphery of the protrusion 121.

According to the second embodiment, the mount member 120 which is provided with the protrusion 121 has at least one of a thin-walled portion 122 which has a smaller thickness than a base portion of the mount member 120 to construct a recess (which is positioned along protrusion 121, for example) at the inner side of the mount member 120, a thick-walled portion 123 which has a larger thickness than the base portion of the mount member 120 to project toward the inner side of the mount member 120, and a multilayer portion 124 having a stack member 124a which is fixed to the mount member 120 at the inner side thereof and made of a different material from that of the mount member 120. In this case, the thin-walled portion 122, the thick-walled portion 123 and the multilayer portion 124 are arranged around the protrusion 121 of the mount member 120. The base portion means a part of the mount member 120 where the thin-walled portion 122, the thick-walled portion 123 and the multilayer portion 124 are not formed.

Thus, a stiffness of a part of the mount member 120 where is around the protrusion 121 is different from a stiffness of a part of the mount member 120 where the protrusion 121 is formed. In addition, because ultrasonic wave (vibration) will be damped in the course of being transmitted in the mount member 120, the effect of the unnecessary-vibration reduction decreases with an increase of a distance between the protrusion 121 and the thin-walled portion 122, the thick-walled portion 123 or the multilayer portion 124. Accordingly, it is desirable that the thin-walled portion 122, the thick-walled portion 123 and the multilayer portion 124 are positioned in the vicinity of the protrusion 121.

Figure 3A:
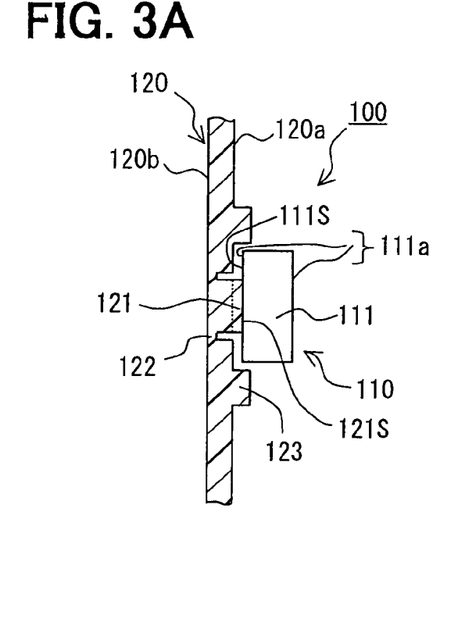
FIG. 3A is a partially sectional view showing an obstacle detection device according to a second embodiment of the present invention.
Figure 3B:
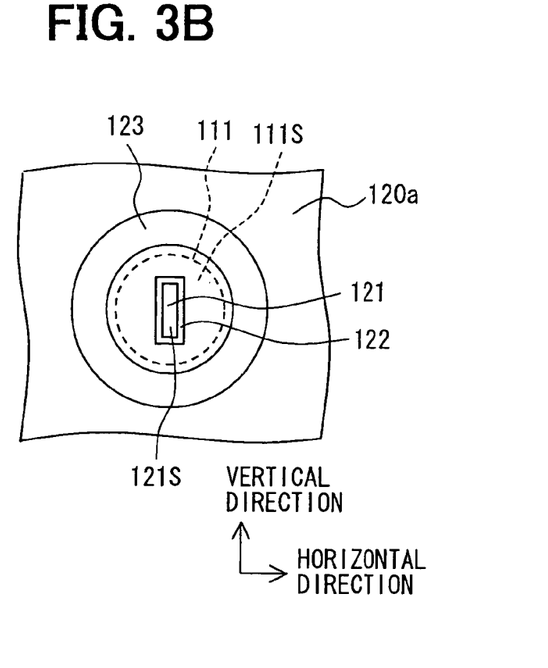
FIG. 3B is a plan view showing a mount member of the obstacle detection device when being viewed from an inner side of the mount member according to the second embodiment.

According to this embodiment, as shown in FIGS. 3A and 3B, the annular thin-walled portion 122 is arranged at the mount member 120, to surround the protrusion 121 in the vicinity of the protrusion 121. In FIG. 3B, the outer boundary of the mounting surface 111s of the ultrasonic oscillator 111 is indicated by a broken line to show the positional relationship.

Moreover, the mount member 120 has the annular thick-walled portion 123 which surrounds the protrusion 121. The thick-walled portion 123 does not contact the ultrasonic oscillator 111. That is, the thick-walled portion 123 which is arranged at the mount member 120 is spaced from the ultrasonic oscillator 111.

In this case, the base portion of the mount member 120 where the protrusion 121, the thin-walled portion 122, the thick-walled portion 123 and the like are not formed has a thickness which is defined as a criterion thickness for mentioning the thin-walled portion 122, the thick-walled portion 123 and the like.

Figure 4A:
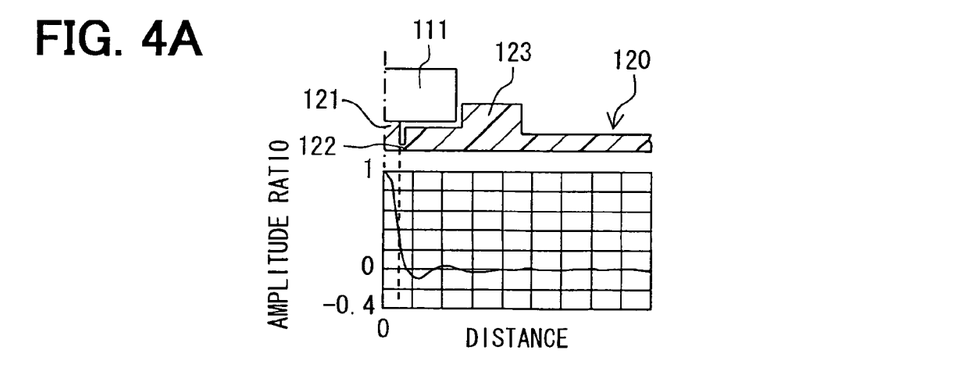
FIG. 4A is a graph showing a vibration mode at the time of a maximum amplitude when voltage is applied to an ultrasonic oscillator according to the second embodiment.
Figure 4B:
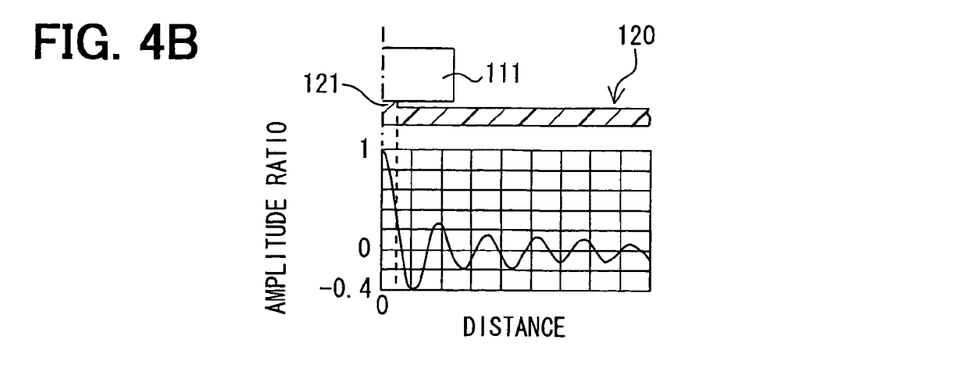
FIG. 4B is a graph showing a vibration mode at the time of a maximum amplitude when voltage is applied to an ultrasonic oscillator according to the first embodiment as a comparison example.

A vibration-mode analysis of the obstacle detection device 100 according to this manner is performed via a finite element method (FEM method), with reference to FIGS. 4A and 4B which show the vibration mode in the case of the maximum amplitude when voltage is applied to the ultrasonic oscillator 111. FIG. 4A shows the obstacle detection device 100 according to the second embodiment. FIG. 4B shows the obstacle detection device 100 according to the first embodiment, as a comparison example.

As shown in FIGS. 4A and 4B, the unnecessary vibration transmitted to the periphery of the protrusion 121 at the mount member 120 is smaller in the case of the obstacle detection device 100 according to the second embodiment, than in the case of the obstacle detection device 100 according to the first embodiment.

Figure 5:
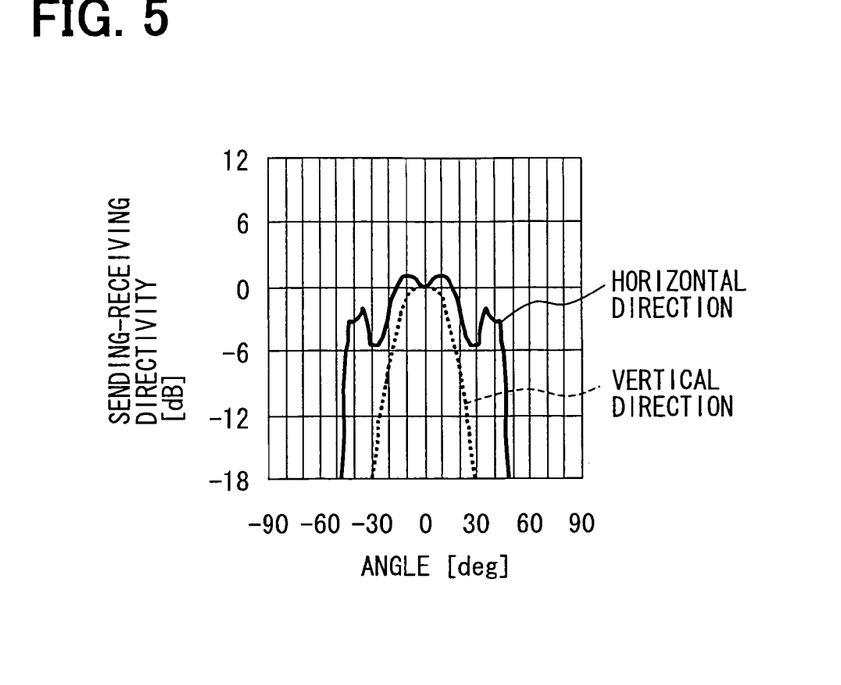
FIG. 5 is a graph showing measurement results of a seconding-receiving directivity of the obstacle detection device according to the second embodiment.

As shown in FIG. 5, the deterioration of the directivity of the obstacle detection device 100 according to the second embodiment is reduced, as compared with the obstacle detection device 100 according to the first embodiment.

According to the obstacle detection device 100 of the second embodiment, the unnecessary vibration transferred to the periphery of the protrusion 121 (i.e., unnecessary vibration which will be transmitted from periphery of protrusion 121) can be reduced by the arrangement of the thin-walled portion 122 and the thick-walled portion 123 at the mount member 120. Accordingly, the directivity deterioration due to the unnecessary vibration can be restricted. Thus, a desired directivity can be maintained with a satisfactory accuracy. That is, a non-detected area can be decreased.

Specifically, according to this embodiment, the thin-walled portion 122 and the thick-walled portion 123 are formed substantially annularly to surround the protrusion 121. Accordingly, the vibration can be restricted from being transferred to an excessively broad range of the mount member 120, thus effectively reducing the unnecessary vibration of the mount member 120.

Further, according to this embodiment, the thin-walled portion 122 is positioned adjacent to the protrusion 121, so that the unnecessary vibration can be effectively reduced. Moreover, the mount member 120 can be provided with a vibration mode which is further close to a shape of the end surface 121s of the protrusion 121.

As described above, both the thin-walled portion 122 and the thick-walled portion 123 are provided at the mount member 120 to surround the protrusion 121. Alternatively, the mount member 120 can be also provided with one of the thin-walled portion 122 and the thick-walled portion 123.

More alternatively, the thick-walled portion 123 can be also positioned closer to the protrusion 121 than the thin-walled portion 122 does.

Figure 6:
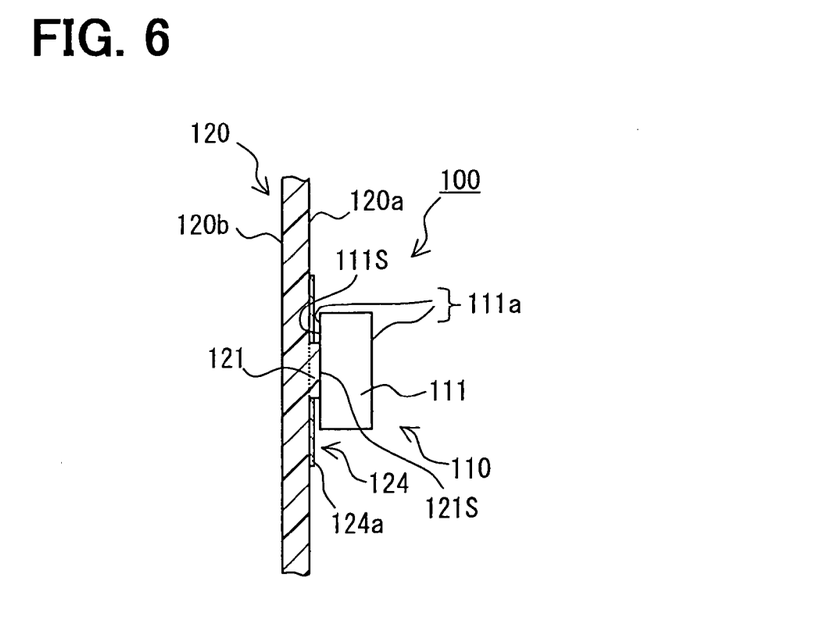
FIG. 6 is a partially sectional view showing an obstacle detection device according to a first modification of the second embodiment.

More alternatively, as shown in FIG. 6, the mount member 120 can be provided with the multilayer portion 124. That is, a stack member 124a is fixed at the base portion of the mount member 120, so that the multilayer portion 124 is constructed. The stack member 124a is made of a different material (e.g., metal) from that of the mount member 120 and fixed to the inner surface 120a of the mount member 120. In this case, the multilayer portion 124 is spaced from the ultrasonic oscillator 111, not to contact therewith.

Thus, the stiffness of the mount member 120 around the protrusion 121 thereof becomes different from that where the protrusion is positioned, thus reducing the unnecessary vibration transmitted to the periphery of the protrusion 121. Therefore, the unnecessary vibration of the mount member 120 which is transmitted from the periphery of the protrusion 121 can be restricted.

As described above, the stack member 124a of the multilayer portion 124 can be made of the metal, which has the higher stiffness than the mount member 120. Alternatively, the stack member 124a can be made of a material such as a rubber or gel, to buffer (damp) the unnecessary vibration. The multilayer portion 124 where the stack member 124a is stacked at the base portion of the mount member 120 has a different stiffness from the part of the mount member 120 where the protrusion 121 is formed.

Figure 7:
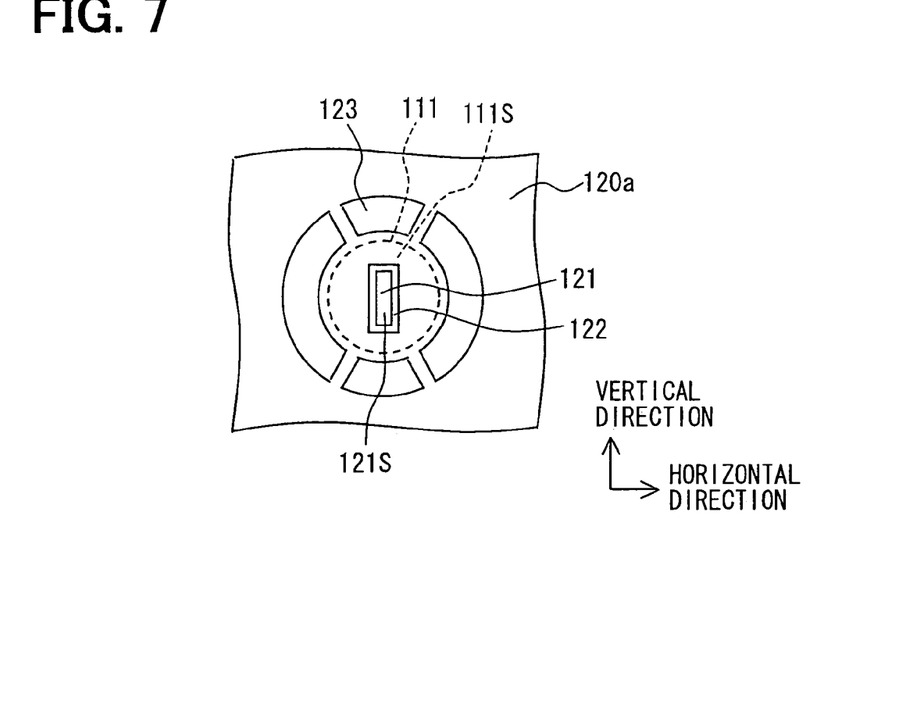
FIG. 7 is a plan view showing a mount member according to a second modification of the second embodiment.

Moreover, as described above, each of the thin-walled portion 122 and the thick-walled portion 123 which are arranged at the mount member 120 has the integrally annular shape. Alternatively, as shown in FIG. 7, the thick-walled portion 123 of the mount member 120 can be also split and have an annular shape on the whole, when being viewed from the side of the inner surface 120a. That is, the protrusion portion (which protrudes from base portion of mount member 120) of the thick-walled portion 123 is constructed of multiple members which are separated from each other and have the annular shape on the whole, when being viewed from the side of the inner surface 120. Similarly to the thick-walled portion 123, the thin-walled portion 122 and the multilayer portion 124 can be also provided with the construction as described here. In FIG. 7, the outer boundary of the mounting surface ills of the ultrasonic oscillator 111 is indicated by the broken line to show the positional relationship.

Furthermore, the shapes and magnitudes of the thin-walled portion 122, the thick-walled portion 123, and the multilayer portion 124 in a surface direction of the mount member 120 are not limited by the shape and magnitude of the end surface 121s of the protrusion 121, conditioning that the thin-walled portion 122, the thick-walled portion 123, and the multilayer portion 124 can be provided with the constructions capable of efficiently reducing the unnecessary vibration.

Third Embodiment

A third embodiment of the present invention will be described with reference to FIGS. 8A and 8B.

In the above-described first and second embodiments, the ultrasonic oscillator 111 of the ultrasonic sensor 110 is mounted directly to the inner surface 120a of the mount member 120. In this case, the ultrasonic oscillator 111 is exposed to, for example, ambient air although the ultrasonic oscillator 111 is arranged at the side of the inner surface 120a of the mount member 120. Therefore, there may occur a corrosion at the lead 111a, or the like.

According to the third embodiment, the sensor constituent elements such as the ultrasonic oscillator 111 and the like are accommodated in a housing 112 which is fixed to the inner surface 120a of the mount member 120. Thus, the sensor constituent elements can be protected from the ambient air.

Figure 8A:
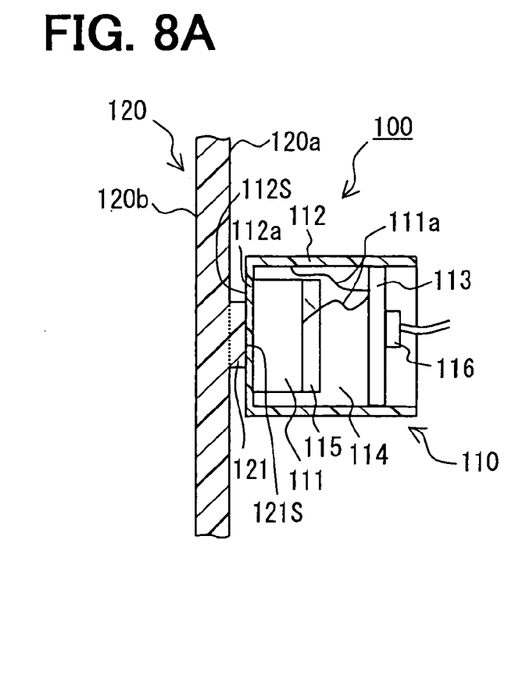
FIG. 8A is a partially sectional view showing an obstacle detection device according to a third embodiment of the present invention.
Figure 8B:
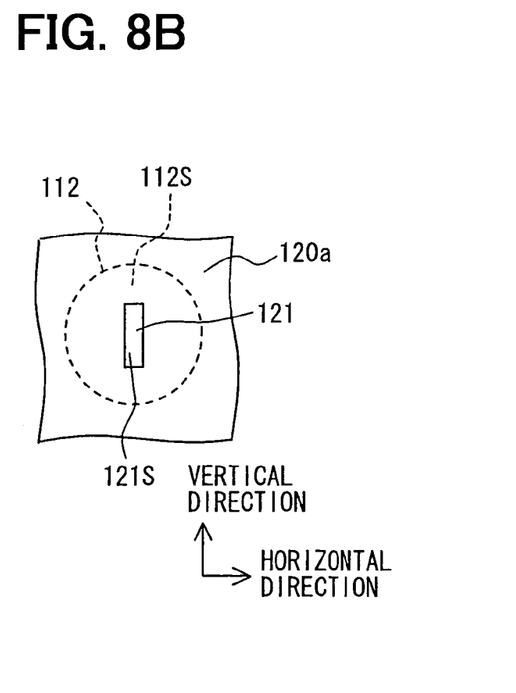
FIG. 8B is a plan view showing a mount member of the obstacle detection device when being viewed from an inner side of the mount member according to the third embodiment.

As shown in FIG. 8A, the housing 112 of the obstacle detection device 100 is made of, for example, a synthetic resin and has a bottomed hollowed shape (e.g., cylindrical shape). The ultrasonic oscillator 111 can be, for example, adhesively fixed to an inner surface of a bottom portion 112a (i.e., end portion) of the housing 112.

The housing 112 (e.g., side surfaces of housing 112) can be fixedly mounted by the support member (holder) (not shown) fixed to the inner surface 120a of the mount member 120, in such a manner that the bottom portion 112a of the housing 112 contacts the inner surface 120a (protrusion 121 of mount member 120). In this case, the manner for fixing the ultrasonic sensor 110 is not specifically limitative.

In this embodiment, the mount member 120 is provided with the protrusion 121 to contact the bottom portion 112a of the housing 112, as compared with the first embodiment where the protrusion 121 contacts the ultrasonic oscillator 111.

According to the third embodiment, the ultrasonic sensor 110 can be provided with a circuit board 113, a vibration absorber 114, a sound absorbing material 115 and the ultrasonic oscillator 111, which are arranged in the housing 112. The circuit board 113 is connected to the ultrasonic oscillator 111 through the lead 111a to form a processing circuit, which outputs the drive signal to vibrate-excite the ultrasonic oscillator 111 to generate ultrasonic wave. In the case where ultrasonic wave is transmitted to the ultrasonic oscillator 111 to cause strain at the ultrasonic oscillator 111, a voltage signal generated due to the piezoelectric effect is inputted to the processing circuit. For example, the processing circuit can calculate a distance between the vehicle and the obstacle around the vehicle on the basis of time, which has elapsed from sending of ultrasonic wave to receiving of ultrasonic wave.

Moreover, the ultrasonic sensor 110 can be provided with a connector 116 for connecting the processing circuit of the circuit board 113 with a control unit, which is provided in, for example, a passenger compartment of the vehicle to perform informative processing, etc.

In this case, the protrusion 121 is arranged at the inner surface 120a of the mount member 120 to contact the mounting surface 112s (i.e., outer surface of bottom portion 112a) of the housing 112 of the ultrasonic sensor 110. That is, ultrasonic wave (vibration) is transmitted between the ultrasonic sensor 110 (ultrasonic oscillator 111 and bottom portion 112a of housing 112) and the mount member 120 through the protrusion 121.

Specifically, the protrusion 121 is structured such that the end surface 121s of the protrusion 121 and the outer surface 112s of the bottom portion 112a of the housing 112 are different from each other in at least one of shape and area. Thus, the main transmission range of ultrasonic wave (vibration), which is transmitted between the ultrasonic sensor 110 (ultrasonic oscillator 111 and bottom portion 112a of housing 112) and the mount member 120, can be restricted via the protrusion 121 to be defined in a predetermined range.

Moreover, the protrusion 121 can be integrated (e.g., integrally molded) with the mount member 120 by the same material. As shown in FIG. 8B, the end surface 121s of the protrusion 121 has a smaller area than the outer surface 112s (having substantially circular shape) of the bottom portion 112a, and has a substantially rectangular shape which is longer in the vertical direction than in the horizontal direction. Therefore, the whole end surface 121s of the protrusion 121 is in contact with the outer surface 112s of the bottom portion 112a. In FIG. 8B, the outer boundary of the contact surface 112s (i.e., outer surface of bottom portion 112a) of the housing 112 is indicated by a broken line to show the positional relationship.

According to the third embodiment, the ultrasonic oscillator 111 is accommodated in the housing 112. The protrusion 121 has the end surface 121s which is different from the outer surface 112s of the bottom portion 112a of the housing 112 in at least one of shape and area. Thus, the main transmission range of ultrasonic wave (vibration) can be restricted (defined in predetermined range) by the protrusion 121.

Accordingly, it is capable to provide a desired directivity in the similar manner to the first embodiment. Moreover, because the protrusion 121 can be optionally set in shape, it is capable to provide a desired directivity (e.g., lopsided directivity) in the similar manner to the first embodiment (referring to FIG. 2).

Fourth Embodiment

A fourth embodiment of the present invention will be described with reference to FIGS. 9A and 9B. According to the fourth embodiment, the mount member 120 is provided with the construction described in the second embodiment and the obstacle detection device 100 is provided with the construction according to the above-described third embodiment. That is, the fourth embodiment is the same as the second embodiment except the construction of the ultrasonic sensor 110.

In the fourth embodiment, the mount member 120 is provided with at least one of the thin-walled portion 122 which is dented from the inner surface 120 and thinner than the base portion (where protrusion 121 is not arranged) of the mount member 120, the thick-walled portion 123 which projects toward the inner side (i.e., side of housing 112) of the mount member 120 and is thicker than the base portion of the mount member 120, and the multilayer portion 124 where the stack member 124a is fixed to the base portion of the mount member 120 is made of the different material from that of the mount member 120. The thin-walled portion 122, the thick-walled portion 123 and the multilayer portion 124 are positioned around the protrusion 121 of the mount member 120.

In this case, the circuit board 113, the vibration absorber 114, the sound absorbing material 115 and the ultrasonic oscillator 111 of the ultrasonic sensor 110 are arranged in the housing 112. The protrusion 121 of the mount member 120 contacts the bottom portion 112a of the housing 112, without contacting the ultrasonic oscillator 111.

Figure 9A:
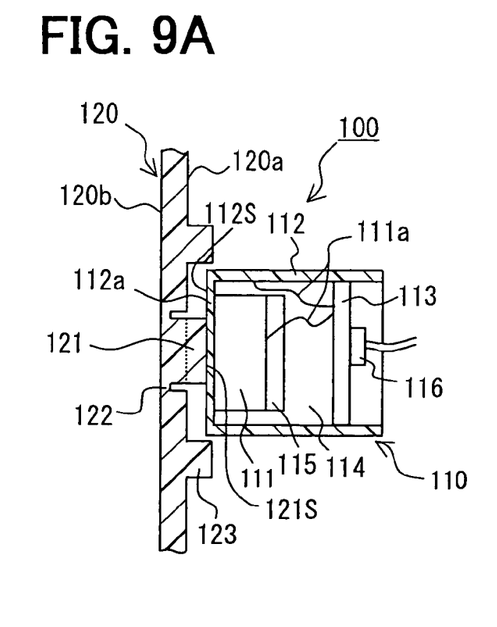
FIG. 9A is a partially sectional view showing an obstacle detection device according to a fourth embodiment of the present invention.
Figure 9B:
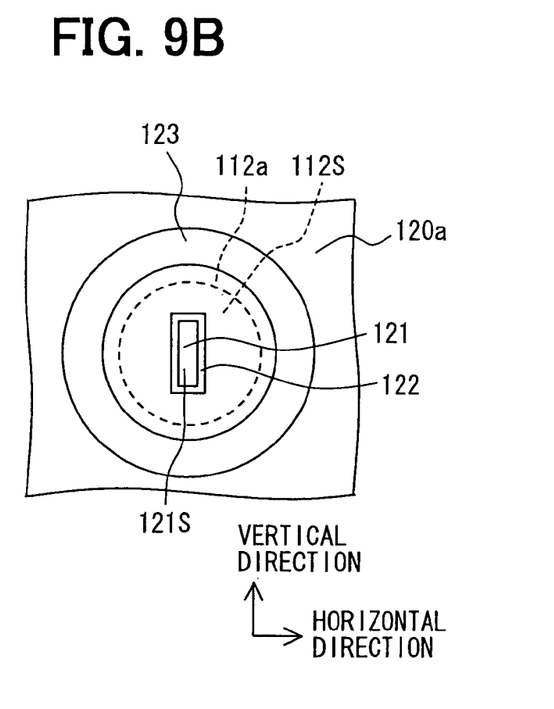
FIG. 9B is a plan view showing a mount member of the obstacle detection device when being viewed from an inner side of the mount member according to the fourth embodiment.

According to this embodiment, as shown in FIGS. 9A and 9B, the annular thin-walled portion 122 is arranged at the mount member 120 to surround the protrusion 121. The annular thick-walled portion 123 can be also provided to surround the protrusion 121. The annular thick-walled portion 123 is spaced from the housing 112. In FIG. 9B, the outer boundary of the mounting surface 112s (i.e., outer surface of bottom portion 112a) of the housing 112 is indicated by a broken line to show the positional relationship.

Because the thin-walled portion 122 and the thick-walled portion 123 are arranged at the mount member 120 where the housing 112 (accommodating therein ultrasonic oscillator 111) is fixed, the unnecessary vibration transmitted to the periphery of the protrusion can be restricted similarly to the second embodiment (referring to FIGS. 4A and 4B). That is, the unnecessary vibration of the mount member 120 which is transmitted from the periphery of the protrusion can be reduced.

Accordingly, the deterioration of the directivity due to the unnecessary vibration can be restricted similarly to the second embodiment (referring to FIG. 5). Thus, a desired directivity can be provided with a good accuracy. That is, it is capable to decrease a non-detected area.

Moreover, according to this embodiment, the thin-walled portion 122 and the thick-walled portion 123 are arranged to surround the protrusion 121. Accordingly, the vibration can be restricted from being transferred to the excessively broad range of the mount member 120. Furthermore, the thin-walled portion 122 is positioned adjacent to the protrusion 121, so that the unnecessary vibration can be effectively reduced. It is capable to obtain the vibration mode which is further close to the shape of the end surface 121s of the protrusion 121 of the mount member 120.

Fifth Embodiment

Figure 10A:
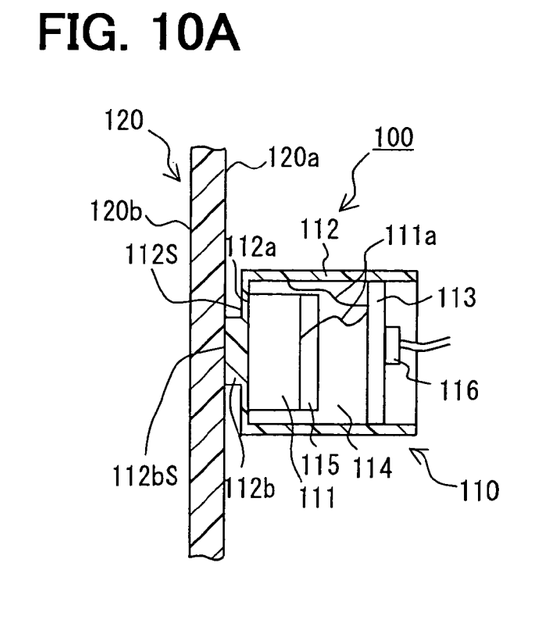
FIG. 10A is a partially sectional view showing an obstacle detection device according to a fifth embodiment of the present invention.

A fifth embodiment of the present invention will be described with reference to FIGS. 10A and 10B.

In the above-described first-fourth embodiments, the protrusion 121 is formed at the mount member 120 to restrict the main transmission range of ultrasonic wave (vibration). According to the fifth embodiment, a protrusion 112b is formed at the housing 112 of the ultrasonic sensor 110, to restrict the main transmission range of ultrasonic wave. That is, the transmission ultrasonic wave is defined in a predetermined range.

In this case, the protrusion 112b protrudes from the outer surface 112s (which faces inner surface 120a of mount member 120) of the bottom portion 112a of the housing 112. That is, the protrusion 112b protrudes from a part of the outer surface 112s of the bottom portion 112a, so that an end surface 112bs of the protrusion 112b contacts the inner surface 120 of the mount member 120. Thus, the contact area between the mount member 120 and the ultrasonic sensor 110 can be reduced, as compared with the case where the housing 112 contacts the mount member 120 at the whole outer surface 112s of the bottom portion 112a of the housing 112.

In this embodiment, the ultrasonic sensor 110 has the similar construction to that described in the third embodiment. According to the fifth embodiment, as shown in FIGS. 10A and 10B, the protrusion 112b protrudes from the outer surface 112s of the bottom portion 112a of the housing 112. The ultrasonic sensor 110 is fixed to the mount member 120 in such a manner that the protrusion 112b contacts the inner surface 120a of the mount member 120. The housing 112 can be fixedly mounted via the support member (e.g., holder which is not shown) which is fixed to the inner surface 120a of the mount member 120. In this case, the manner for fixing the ultrasonic sensor 110 is not limitative.

According to this embodiment, the protrusion 112b is formed on the outer surface 112S of the bottom portion 112a of the housing 112 of the ultrasonic sensor 110. That is, ultrasonic wave (vibration) is transmitted between the ultrasonic sensor 110 (ultrasonic oscillator 111 and bottom portion 112a of housing 112) and the mount member 120 through the protrusion 121.

The protrusion 112b is formed at the part of the outer surface 112s of the bottom portion 112a. The end surface 112bs (at side of mount member 120) of the protrusion 112b and the outer surface 112s of the bottom portion 112a of the housing 112 are different from each other, at least one area and shape. Accordingly, the main transmission range of ultrasonic wave (vibration) can be restricted by the protrusion 112b, so that a desired directivity can be provided with a good accuracy.

Figure 10B:
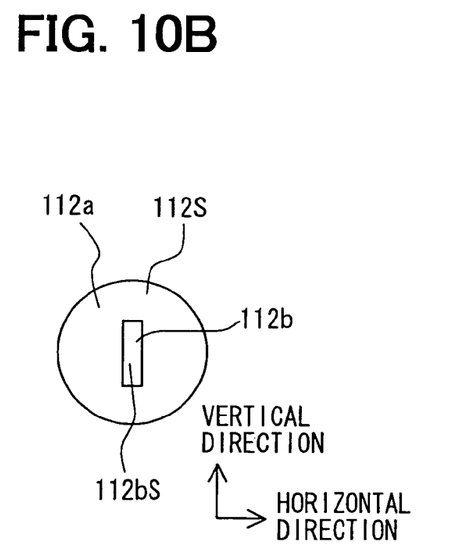
FIG. 10B is a plan view showing a mount member of the obstacle detection device when being viewed from an inner side of the mount member according to the fifth embodiment.

As shown in FIG. 10B, the end surface 112s of the protrusion 112b, which contacts the inner surface 120a of the mount member 120, has a different shape from the outer surface 112s of the bottom portion 112a. That is, the shape of the protrusion 112b can be optionally set. Therefore, it is capable to provide a desired directivity, for example, the lopsided directivity (e.g., directivity in vertical direction is different from that in horizontal direction relative to ground surface).

The end surface 112bs of the protrusion 112b can have a substantially rectangular shape which is longer in the vertical direction than in the horizontal direction. In this case, the bottom portion 112a can be substantially columnar-shaped, for example.

Accordingly, the obstacle detection device 100 can be provide with a directivity which is narrow in the vertical direction and wide in the horizontal direction, in the same manner as shown in FIG. 2 of the first embodiment. Thus, the obstacle detection device 100 according to the fifth embodiment can be suitably used as the obstacle detection device for the vehicle.

Moreover, the protrusion 112b is integrated (e.g., integrally molded) with the housing 112 via the same material, thus restricting the reflection loss due to the boundary surface between different materials having difference acoustic impedances. Alternatively, the protrusion 112b can be also separately formed from the housing 112, and can be made of a different material from that of the mount member 120.

As described above, the end surface 112bs of the protrusion 112b, which contacts the inner surface 120a of the mount member 120, can be different in shape from the outer surface 112s of the bottom portion 112a. However, the shape and the area of the end surface of the protrusion 112b can be optionally set according to a requested detection area and frequency of ultrasonic wave sent and received. The shape of the end surface 112bs of the protrusion 112b can be set same with the outer surface 112s of the bottom portion 112a, and only the area of the end surface 112bs of the protrusion 112b is different from that of the outer surface 112s of the bottom portion 112a.

Moreover, the plurality of protrusions 112b can be also provided for the housing 112. In this case, ultrasonic wave (vibration) can be transmitted through the plurality of protrusions 112b.

Sixth Embodiment

A sixth embodiment of the present invention will be described with reference to FIGS. 11A and 11B. According to the sixth embodiment, the mount member 120 has a construction similar to that according to the second embodiment, and the ultrasonic sensor 110 has a construction similar to that according to the fifth embodiment.

That is, the mount member 120 can be provided with at least one of the thin-walled portion 122 which is dented from the inner surface 120a of the mount member 120 and thinner than the base portion of the mount member 120, the thick-walled portion 123 which projects toward the inner side of the mount member 120 and is thicker than the base portion of the mount member 120, and the multilayer portion 124 having the stack member 124a which is arranged at the base portion of the mount member 120 and made of the different material from that of the mount member 120. The thin-walled portion 122, the thick-walled portion 123, and the multilayer portion 124 are positioned around the part of the mount member 120 which contacts the housing 112.

In this case, the housing 112 has the protrusion 112b which protrudes from the outer surface 112s of the bottom portion 112a of the housing 112 so that the end surface 112bs contacts a contact location 125 (without being provided with protrusion 121) of the base portion of the mount member 120. The contact location 125 is surrounded by the thin-walled portion 122, and/or the thick-walled portion 123, and/or the multilayer portion 124.

Figure 11A:
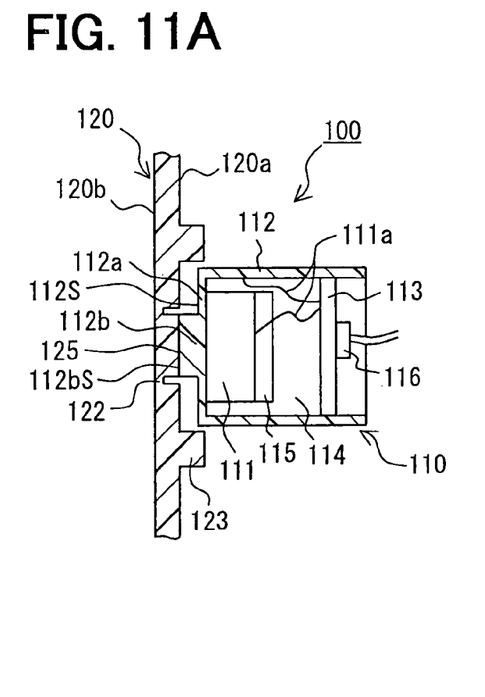
FIG. 11A is a partially sectional view showing an obstacle detection device according to a sixth embodiment of the present invention.
Figure 11B:
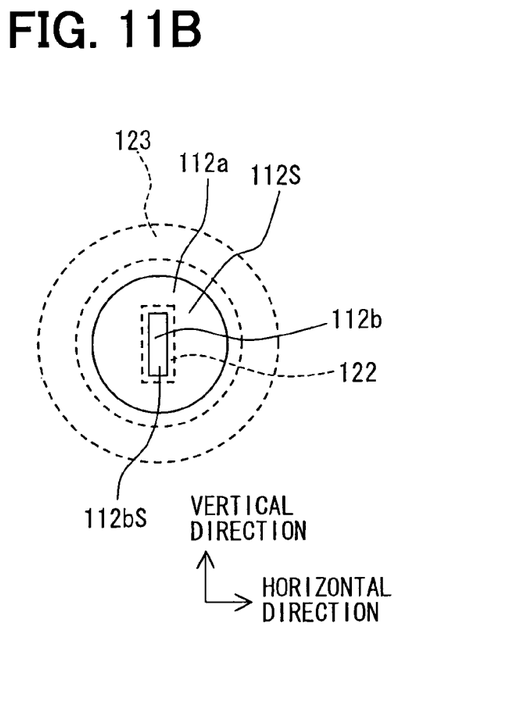
FIG. 11B is a plan view showing a mount member of the obstacle detection device when being viewed from an inner side of the mount member according to the sixth embodiment.

According to this embodiment, as shown in FIGS. 11A and 11B, the annular thin-walled portion 122 is formed at the mount member 120 to surround the contact location 125 in the vicinity of (e.g., along) the contact location 125. The annular thick-walled portion 123 surrounding the contact location 125 is spaced from the housing 112. In FIG. 11B, the boundaries of the thin-walled portion 122 and the thick-walled portion 123, which are arranged at the mount member 120, are indicated by broken lines to show the positional relationship.

Because the thin-walled portion 122 and the thick-walled portion 123 are arranged at the mount member 120 and the protrusion 112b is arranged at the housing 112, the unnecessary vibration (unnecessary vibrations transmitted from the periphery of the contact portion) transmitted to the periphery of the contact location 125 can be reduced similarly to the second embodiment (referring to FIGS. 4A and 4B). Accordingly, the deterioration of the directivity due to the unnecessary vibration can be restricted similarly to the second embodiment (referring to FIG. 5). Therefore, a desired directivity can be provided with a good accuracy. That is, it becomes capable to decrease a non-detected area.

Specifically, according to this embodiment, the thin-walled portion 122 and the thick-walled portion 123 are positioned to surround the contact location 125. Accordingly, the vibration can be restricted from being transmitted to excessively board range of the mount member 120, thus effectively reducing the unnecessary vibration. It is capable to obtain a vibration mode, which is further close to the shape of the end surface 112bs of the protrusion 112b of the housing 112.

Next, a modification of the sixth embodiment will be described.

Figure 12A:
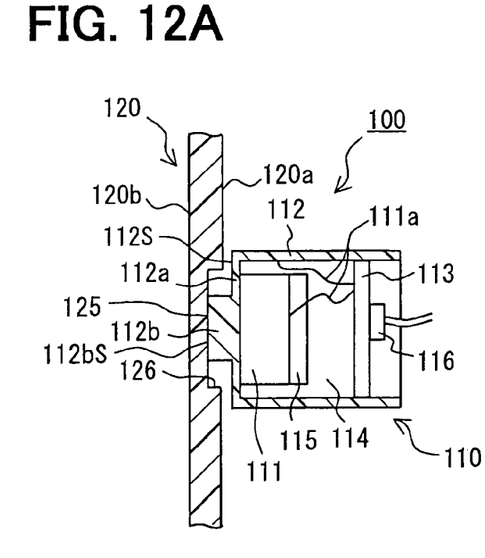
FIG. 12A is a partially sectional view showing an obstacle detection device according to a modification of the sixth embodiment.
Figure 12B:
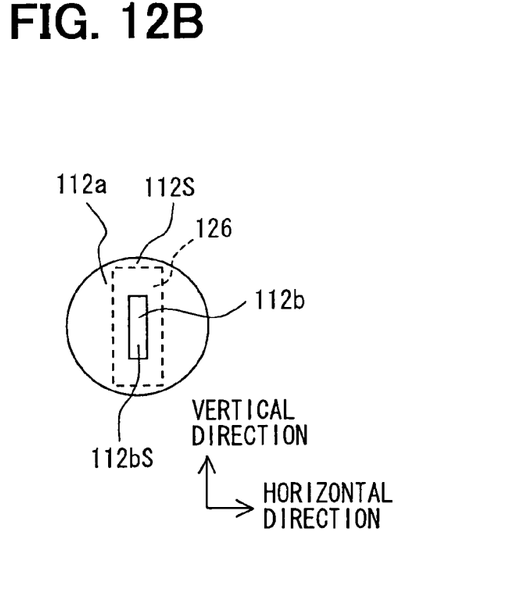
FIG. 12B is a plan view showing a mount member of the obstacle detection device when being viewed from an inner side of the mount member according to the modification of the sixth embodiment.

As shown in FIGS. 12A and 12B, in that construction, a groove 126 (recess) can be arranged at the mount member 120, and the protrusion 112b contacts a bottom surface of the groove 126. In this case, the peripheral portion of the groove 126, which is not specifically worked, serves as the same function as that of the thick-walled portion 123. In FIG. 12B, the boundary of the groove 126 formed at the mount member 120 is indicated by a broken line to show the positional relationship.

Thus, the unnecessary vibration transmitted to the periphery of the contact portion between the protrusion 112b and the bottom surface of the groove 126 can be effectively reduced. Thus, the unnecessary vibration transmitted from the periphery of the contact portion can be reduced. Moreover, because the groove 126 is formed to enable regulating a distance of transmission of ultrasonic wave (vibration), the design freedom can be improved.

Other Embodiments

Although the present invention has been fully described in connection with the preferred embodiments thereof with reference to the accompanying drawings, it is to be noted that various changes and modifications will become apparent to those skilled in the art.

In the above-described embodiments, ultrasonic wave is sent and received by the single ultrasonic oscillator 111. However, the ultrasonic oscillator for sending of ultrasonic wave and that for receiving of ultrasonic wave can be also respectively provided.

Moreover, in the above-described embodiments, the support member (holder) fixes the ultrasonic sensor 110 to the inner surface 120a of the mount member 120. However, the ultrasonic sensor 11 can be also fixed by other means, such as bonding, screwing and the like.

Furthermore, according to the third to sixth embodiments, the ultrasonic sensor 110 includes the circuit board 113 having the processing circuit. However, it suffices in the embodiments that the ultrasonic sensor 110 includes the ultrasonic oscillator 111 and the housing 112, which accommodates at least the ultrasonic oscillator 111.

Moreover, in the above-described embodiments, the protrusion 121 which is integrated with the mount member 120, or the protrusion 112b which is integrated with the housing 112 of the ultrasonic sensor 110, are provided to limit the main transmission range of ultrasonic wave (vibration). However, the protrusion 121 may be not molded integrally with the mount member 120, to be made of a different material. Similarly, the protrusion 112b may be not molded integrally with the housing 112, to be made of a different material. That is, a vibration transmitting member (protrusion 121, 112b) can be separately arranged to limit the main transmission range of ultrasonic wave (vibration) between the ultrasonic sensor 110 and the mount member 120.

Moreover, the second, fourth and sixth embodiments are premised on the existence of the protrusion 121 arranged at the mount member 120, or the protrusion 112b arranged at the housing 112. However, both the protrusions 121, 112b can be omitted. In this case, at least one of the thin-walled portion 122 and the multilayer portion 124 can be arranged around the contact portion (base portion where ultrasonic sensor 110 contacts) of the mount member 120. The thin-walled portion 122 is thinner than the contact portion of the mount member 120, and the multilayer portion 124 has the stack member 124a which is arranged at the inner surface 120a of the mount member 120 and made of the different material from that of the mount member 120.

In this case, the stiffness of the mount member 120 around the contact portion thereof is different from the stiffness of the contact portion, thus enabling reducing ultrasonic wave (unnecessary vibrations) which is transmitted from the contact portion to other portion of the mount member 120. Therefore, the directivity can be prescribed by the shape of at least one of the thin-walled portion 122 and the multilayer portion 124, which surround the contact portion. That is, a desired directivity can be provided.

Such changes and modifications are to be understood as being in the scope of the present invention as defined by the appended claims.

What is claimed is:

1. An obstacle detection device comprising:
  a mount member on a platform where obstacle detection is provided and having a mounting surface; and
  an ultrasonic sensor which is fixed on its mounting surface to a first side surface of the mount member, the ultrasonic sensor sending ultrasonic wave toward a second side surface of the mount member into an obstacle detection zone and receiving ultrasonic wave from the obstacle detection zone through the second side surface, the first side surface of the mount member being opposite to the second side surface thereof, wherein:

at least one of the mounting surface of the ultrasonic sensor and the mounting surface of the mount member has a protrusion, which protrudes therefrom so that an end surface of the protrusion directly contacts an other of the mounting surfaces, the mounting surface of the mount member being at the first side surface thereof and facing the mounting surface of the ultrasonic sensor; and the end surface of the protrusion is smaller than the mounting surface of the ultrasonic sensor in at least one of shape and area thereof to facilitate directivity of ultrasonic wave into the obstacle detection zone for obstacle detection; whereby the ultrasonic wave is transmitted directly between the ultrasonic sensor and the mount member through the protrusion with said directivity.

2. The obstacle detection device according to claim 1, wherein:

the ultrasonic sensor includes an ultrasound oscillator for sending and receiving ultrasonic wave, and a housing in which the ultrasound oscillator is housed and fixedly contacts an inner surface of an end portion of the housing; and the mounting surface of the ultrasonic sensor is an outer surface of the end portion of the housing, and the protrusion protrudes from the outer surface.

3. The obstacle detection device according to claim 2, wherein the shape of the end surface of the protrusion is different from that of the outer surface of the end portion of the housing, the end surface directly contacting the mounting surface of the mount member.

4. The obstacle detection device according to claim 2, wherein:

the mount member is one of a bumper and a chassis member of a vehicle; and the end surface of the protrusion is longer in a direction perpendicular to a traveling surface of the vehicle, than in a direction parallel to the traveling surface.

5. The obstacle detection device according to claim 2, wherein:

the protrusion of the housing contacts a contact portion of the mount member; and the mount member has at least one of a thin-walled portion which has a smaller thickness than the contact portion of the mount member to construct a recess at the first side surface of the mount member, a thick-walled portion which has a larger thickness than the contact portion to project toward the first side surface of the mount member, and a multilayer portion having a stack member which is made of a different material from that of the mount member and fixed to the first side surface of the mount member, the thin-walled portion, the thick-walled portion and the multilayer portion being positioned around the contact portion of the mount member.

6. The obstacle detection device according to claim 5, wherein at least one of the thin-walled portion, the thick-walled portion, and the multilayer portion has a predetermined annular shape to surround the contact portion of the mount member.

7. The obstacle detection device according to claim 5, wherein one of the thin-walled portion, the thick-walled portion, and the multilayer portion of the mount member is adjacent to the contact portion of the mount member.

8. The obstacle detection device according to claim 1, wherein:

the ultrasonic sensor includes an ultrasound oscillator for sending and receiving ultrasonic wave, and a housing in which the ultrasound oscillator is housed and fixedly contacts an inner surface of an end portion of the housing;

the mounting surface of the ultrasonic sensor is an outer surface of the end portion of the housing; and the protrusion protrudes from the mounting surface of the first side surface of the mount member so that the end surface of the protrusion contacts the outer surface of the end portion of the housing.

9. The obstacle detection device according to claim 8, wherein the end surface of the protrusion is smaller than the outer surface of the end portion of the housing, and the whole end surface of the protrusion is in contact with the outer surface of the end portion of the housing.

10. The obstacle detection device according to claim 1, wherein:

the ultrasonic sensor includes an ultrasound oscillator for sending and receiving ultrasonic wave;

the mounting surface of the ultrasonic sensor is an outer surface of an end portion of the ultrasound oscillator; and the protrusion protrudes from the mounting surface of the first side surface of the mount member so that the end surface of the protrusion contacts the outer surface of the ultrasound oscillator.

11. The obstacle detection device according to claim 10, wherein the end surface of the protrusion is smaller than the outer surface of the ultrasound oscillator, and the whole end surface of the protrusion is in contact with the outer surface of ultrasound oscillator.

12. The obstacle detection device according to claim 8, wherein:

the mount member is one of a bumper and a chassis member a vehicle; and the end surface of the protrusion is longer in a direction perpendicular to a traveling surface of the vehicle, than in a direction parallel to the traveling surface.

13. The obstacle detection device according to claim 8, wherein the protrusion protrudes from a base portion of the mount member toward the first side surface thereof; and the mount member has at least one of a thin-walled portion which has a smaller thickness than the base portion of the mount member to construct a recess at the first side surface of the mount member, a thick-walled portion which has a larger thickness than the base portion to project toward the first side surface of the mount member, and a multilayer portion having a stack member which is made of a different material from that of the base portion and fixed to the base portion at the first side surface of the mount member, the thin-walled portion, the thick-walled portion and the multilayer portion of the mount member being positioned around the protrusion of the mount member.

14. The obstacle detection device according to claim 13, wherein
at least one of the thin-walled portion, the thick-walled portion, and the multilayer portion has a predetermined annular shape to surround the protrusion of the mount member.

15. The obstacle detection device according to claim 13, wherein
one of the thin-walled portion, the thick-walled portion, and the multilayer portion is adjacent to the protrusion of the mount member.

16. An obstacle detection device comprising:
a mount member on a platform where obstacle detection is provided; and
an ultrasonic sensor which is fixedly fixed to a first side surface of the mount member and contacts the mount member at a contact portion of the mount member via a protrusion,
the ultrasonic sensor including an ultrasound oscillator for sending ultrasonic wave toward a second side surface of the mount member into an obstacle detection zone and receiving ultrasonic wave from the obstacle detection zone through the second side surface, the first side surface of the mount member being opposite to the second side surface thereof, wherein
the mount member has at least one of a thin-walled portion which has a smaller thickness than the contact portion of the mount member to construct a recess at the first side surface of the mount member, and a multilayer portion having a stack member which is made of a different material from that of the mount member and fixed to the first side surface of the mount member,
the thin-walled portion and the multilayer portion having a predetermined annular shape to surround the protrusion and the contact portion of the mount member to facilitate directivity of ultrasonic wave into the obstacle detection zone for obstacle detection.

17. The obstacle detection device as in claim 2, wherein
the protrusion is formed as an integral body with the housing from the same material.

18. The obstacle detection device as in claim 8, wherein
the protrusion is formed as an integral body with the mount member from the same material.

19. The obstacle detection device as in claim 10, wherein
the protrusion is formed as an integral body with the mount member from the same material.

* * * * *